(12) United States Patent
Liu et al.

(10) Patent No.: US 7,828,390 B2
(45) Date of Patent: Nov. 9, 2010

(54) VEHICLE SEAT ARMREST ASSEMBLY

(75) Inventors: Hsing Lung Lewis Liu, Wixom, MI (US); Karl A. Murphy, Novi, MI (US); Edward H. Poulos, Grosse Ile, MI (US)

(73) Assignee: Porter Group, LLC, Novi, MI (US)

( * ) Notice: Subject to any disclaimer, the term of this patent is extended or adjusted under 35 U.S.C. 154(b) by 274 days.

(21) Appl. No.: 12/112,243

(22) Filed: Apr. 30, 2008

(65) Prior Publication Data

US 2008/0277991 A1 Nov. 13, 2008

Related U.S. Application Data

(60) Provisional application No. 60/928,564, filed on May 10, 2007.

(51) Int. Cl.
*B60N 2/46* (2006.01)
(52) U.S. Cl. ................................. 297/411.36
(58) Field of Classification Search ............ 297/411.36, 297/353, 411.2, 411.35
See application file for complete search history.

(56) References Cited

U.S. PATENT DOCUMENTS

| | | | |
|---|---|---|---|
| 4,660,885 A | 4/1987 | Suhr et al. | |
| 5,433,509 A | 7/1995 | Hotary et al. | |
| 5,695,249 A * | 12/1997 | Lotfi | ........................... 297/353 |
| 5,735,577 A | 4/1998 | Lin | |
| 5,839,786 A | 11/1998 | Cvek | |
| 5,931,536 A | 8/1999 | Wu | |
| 5,941,603 A | 8/1999 | Wein | |
| 6,502,904 B1 | 1/2003 | Hansen | |
| 6,609,758 B1 | 8/2003 | Lefevere | |
| 6,659,561 B1 | 12/2003 | Lee | |
| 6,824,218 B1 | 11/2004 | van Hekken | |
| 7,252,338 B2 * | 8/2007 | Crossman | ............... 297/411.33 |
| 2004/0090104 A1 | 5/2004 | Seibold | |
| 2005/0189807 A1 | 9/2005 | Norman et al. | |

* cited by examiner

*Primary Examiner*—Milton Nelson, Jr.
(74) *Attorney, Agent, or Firm*—Brooks Kushman P.C.

(57) ABSTRACT

A vehicle armrest assembly (20) includes an armrest (22), a ratchet mechanism (24) having a linear ratchet plate (36) that cooperates with a pawl locking assembly (38) to permit vertical adjustment of the armrest. An upper armrest portion (100) is mounted on an armrest housing (96) by a track (102) for adjustable movement. An adjuster (114) of the armrest permits pivotal adjustment of the armrest as well as pivoting to a nonuse position.

13 Claims, 6 Drawing Sheets

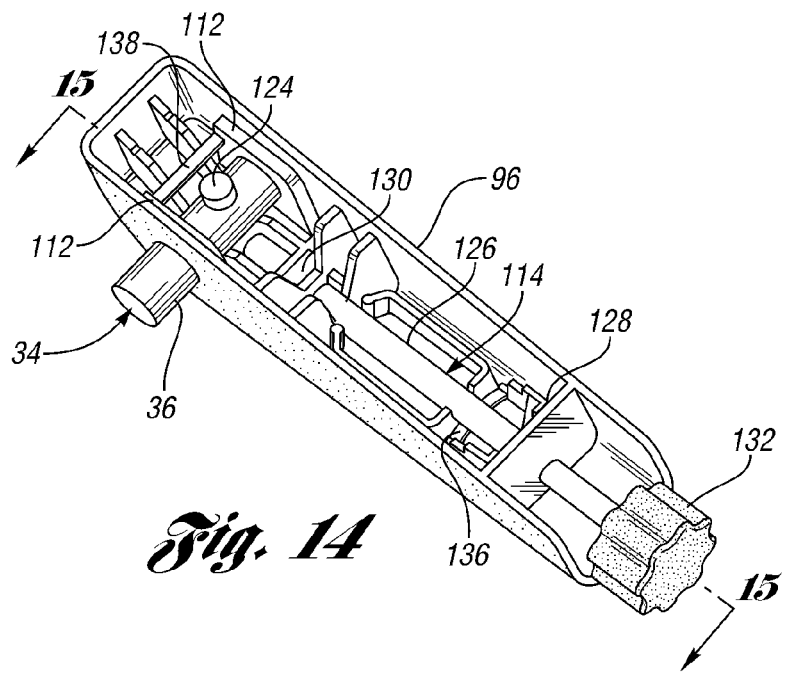
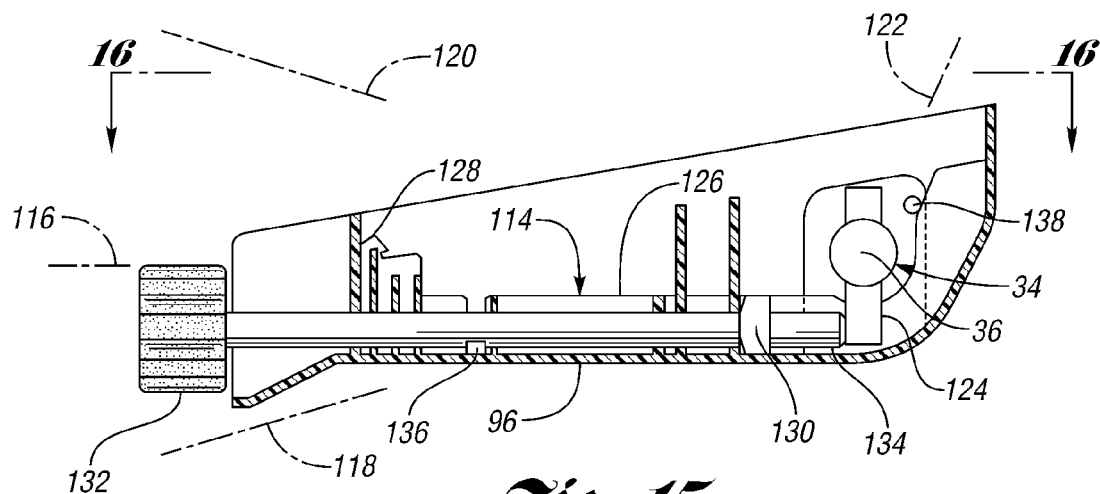
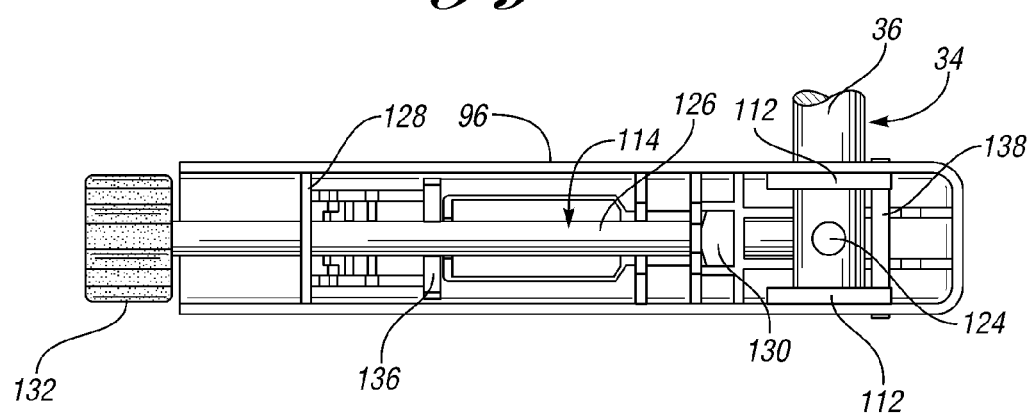

VEHICLE SEAT ARMREST ASSEMBLY

CROSS-REFERENCE TO RELATED APPLICATIONS

This application claims the benefit of U.S. provisional patent application Ser. No. 60/928,564 filed on May 10, 2007 by Hsing Lung Lewis Liu with the title VEHICLE SEAT ADJUSTABLE ARMREST.

BACKGROUND OF THE INVENTION

1. Field of the Invention

This invention relates to a vehicle seat armrest assembly.

2. Background Art

Many vehicle seats include one or two armrests that are mounted on the seat frame to provide comfort to the seat occupant.

Prior art references noted during an investigation conducted in connection with the present application include U.S. Pat. Nos. 5,735,577 Lin; 5,839,786 Cvek; 5,941,603 Wein; 6,502,904 Hansen; 6,609,758 Lefevere and 6,659,561 Lee; and United States Patent Application Publications 2004/0090104 Seibold and 2005/0189807 Norman et al.

SUMMARY OF THE INVENTION

An object of the present invention is to provide an improved vehicle seat armrest assembly.

In carrying our the above object, the vehicle seat armrest assembly of the invention includes an armrest and a ratchet mechanism for mounting the armrest on a vehicle seat frame. The ratchet mechanism includes a vertical track for mounting on the seat frame and a linear ratchet plate mounted for vertical movement on the vertical track. The liner ratchet plate has vertically spaced teeth and a connection to the armrest to support the armrest. A pawl locking assembly is mounted by the vertical track and has a locking condition for cooperating with the teeth of the linear ratchet plate to permit vertical adjustment of the armrest from a lowermost position upwardly to successively higher positions until reaching an uppermost position whereupon the pawl locking mechanism is moved to a released condition to permit downward movement of the armrest to its lowermost position. The pawl locking assembly upon movement of the armrest to its lowermost position is moved from its released condition to its locking condition to again permit the upward armrest adjustment.

The vertical track includes a vertical track member and a pressure plate that is mounted by the vertical track member and cooperates therewith to mount the linear ratchet plate for vertical movement. More specifically, the vertical track member includes spaced flanges that slidably contact one side of the linear ratchet plate, and the pressure plate includes spaced slide portions that slidably contact the other side of the linear ratchet plate. Also, a cover is mounted on and extends between the spaced flanges of the vertical track member.

The pawl locking assembly includes a pawl pivotally mounted on the track for movement between locking and released positions with respect to the linear ratchet plate teeth, and a spring bias biases the pawl toward a locking position for contacting the teeth of the linear ratchet plate to support the armrest at a selected vertical location against downward movement while allowing upward movement to a higher location. The pawl locking assembly also includes a catch. A lower camming surface on the linear ratchet plate cams the pawl against the spring bias from its locking position to a released position out of contact with the linear ratchet plate teeth where the pawl is held by the catch when the armrest is moved to the uppermost position such that the armrest can then be moved to the lowermost position. An upper camming surface on the linear ratchet plate cams the pawl for release from the catch and movement to its locking position when the armrest is moved to its lowermost position in order to again permit upward adjusting movement of the armrest.

As disclosed, the pawl locking assembly includes a spring having one leg that embodies the spring bias and another leg that embodies the catch. Furthermore, the linear ratchet plate includes an upper opening within which its vertically spaced teeth are mounted, and the liner ratchet plate includes a lower opening that receives a connecting member of the armrest connection. Also, the vertical track member, the pressure plate and the cover of the vertical track include vertically openings that receive the connection member of the armrest connection while permitting vertical movement thereof as the armrest is moved vertically.

The vehicle seat armrest assembly as disclosed has the armrest constructed to include a housing mounted by the connection to the ratchet mechanism. A track assembly is mounted by the housing, and an upper armrest portion is mounted on the housing by the track assembly for adjustable movement along the armrest housing. The track assembly as disclosed includes a detent spring for adjustably positioning the upper armrest portion in a selected position on the housing.

The vehicle seat armrest assembly as disclosed has the connection of the ratchet mechanism to the armrest including a pivotal connection member that pivotally mounts the armrest housing. An adjuster adjusts the pivotal position of the armrest on the ratchet mechanism, and the adjuster includes a threaded adjusting member have an knob that is rotated to adjust the pivotal position of the armrest on the ratchet mechanism. The spring mounted on the housing holds the threaded adjustment member against movement after adjustment.

The objects, features and advantages of the present invention are readily apparent from the following detailed description of the preferred embodiment when taken in connection with the accompanying drawings.

BRIEF DESCRIPTION OF THE DRAWINGS

FIG. 14 is a perspective view illustrating the armrest with its upper portion and track assembly removed to illustrate an adjuster that controls pivotal positioning of the armrest.

FIG. 15 is a sectional view taken through the lower housing of the armrest along the direction of line 15-15 in FIG. 14 to further illustrate the adjuster.

FIG. 16 is top plan view of the lower housing of the armrest taken along the direction line 16-16 in FIG. 15.

DETAILED DESCRIPTION OF THE PREFERRED EMBODIMENT

Figure 1:
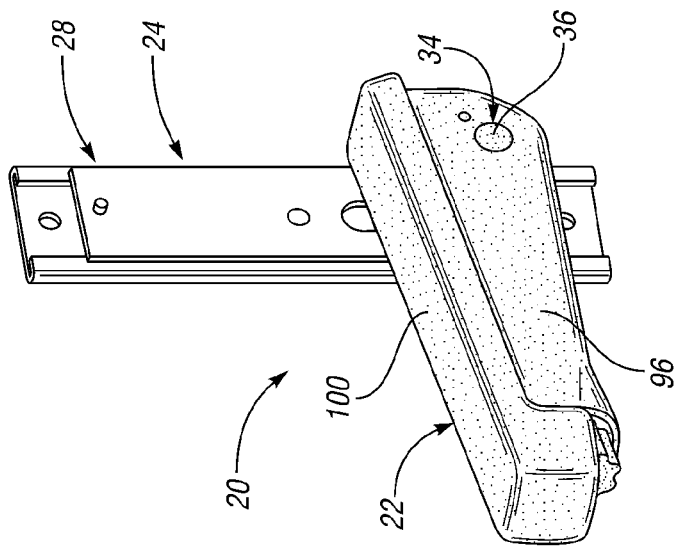
FIG. 1 is a side view of a vehicle seat armrest assembly constructed in accordance with the present invention for mounting on a vehicle seat frame for vertical adjustment.
Figure 2:
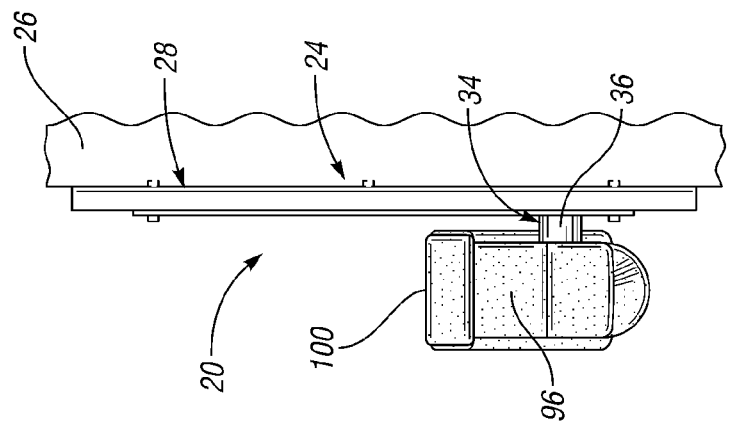
FIG. 2 is a rear view of the armrest assembly taken along the direction of line 2-2 in FIG. 1.
Figure 3:
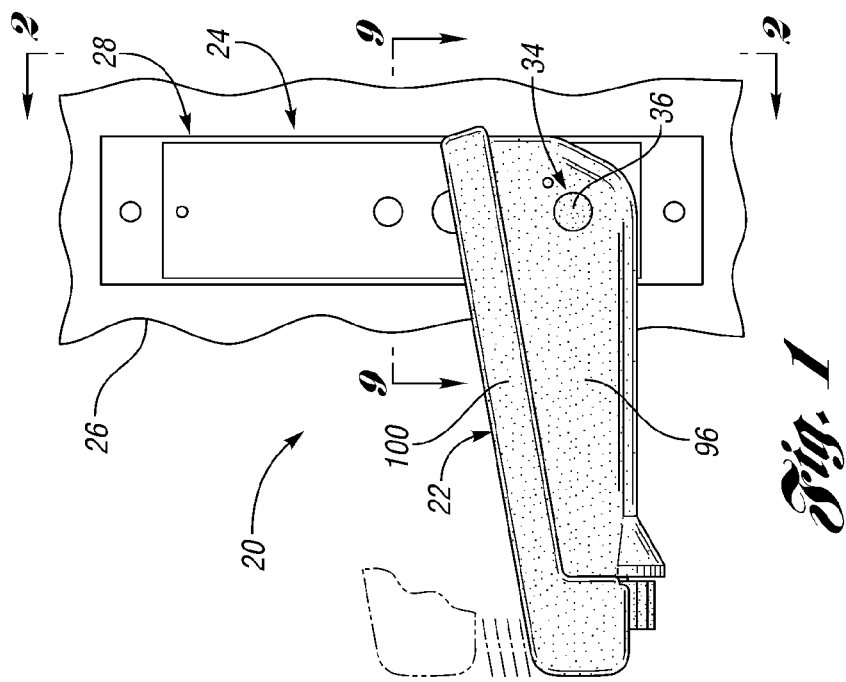
FIG. 3 is a perspective view of the armrest assembly.

With reference to FIGS. 1-3, a vehicle seat armrest assembly constructed in accordance with the present invention is generally indicated by 20 and includes an armrest 22 and a ratchet mechanism 24 that mounts the armrest on a vehicle seat frame 26 for vertical adjusting movement from the lowermost position shown in FIG. 1 to successively higher positions until reaching an uppermost position partially shown by phantom representation. When the armrest 22 is in the uppermost position, the ratchet mechanism 24, as is hereinafter more fully described, releases the armrest for downward movement back to it lowermost position whereupon the ratchet mechanism then again is moved to locked condition to permit the upward adjusting movement to successively higher positions.

Figure 10:
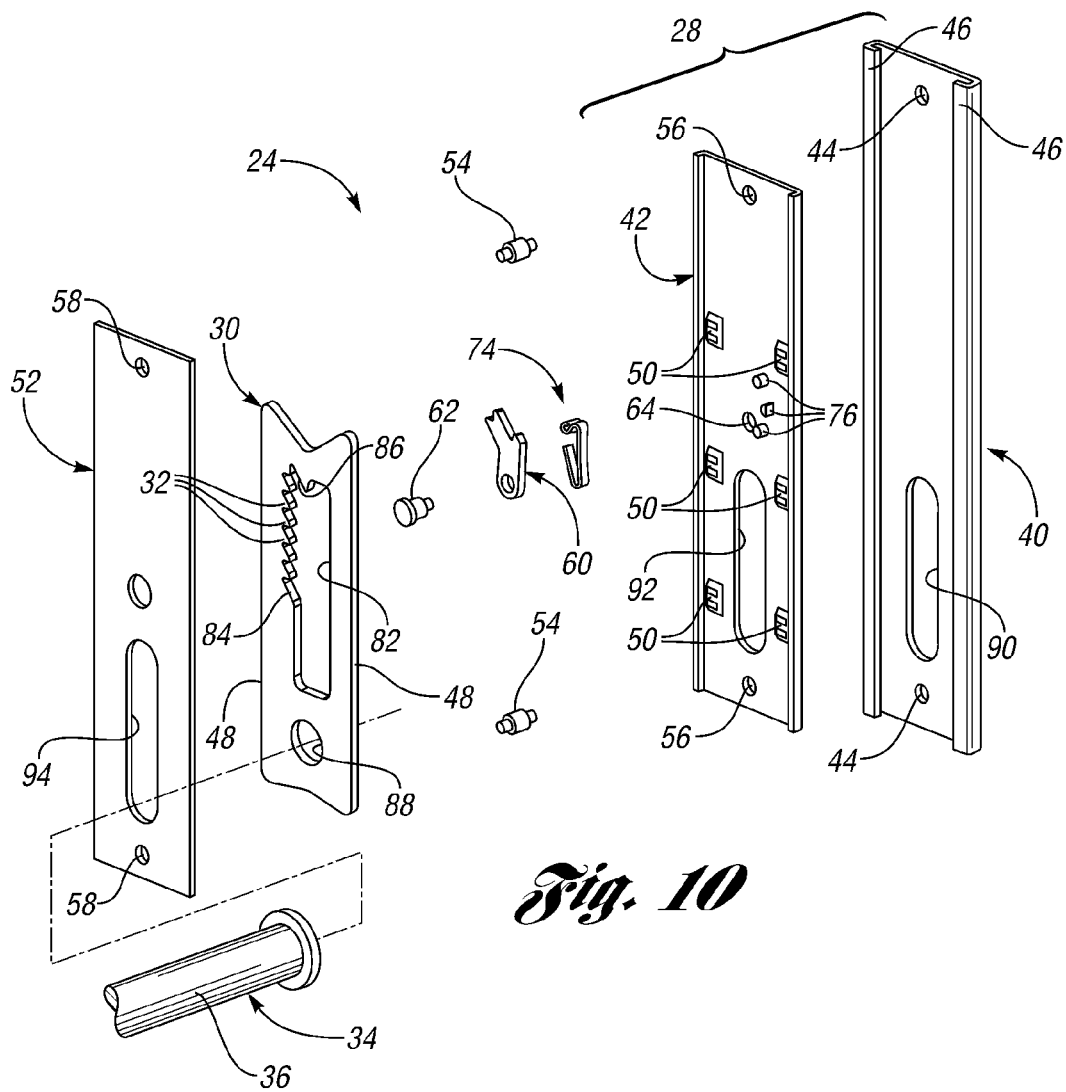
FIG. 10 is an exploded perspective view of the ratchet mechanism that provides the armrest mounting for adjustment.

The ratchet mechanism 24 as shown in FIG. 10 includes a vertical track collectively indicated by 28 for mounting on the seat frame and also includes a linear ratchet plate 30 mounted for vertical movement on the vertical track. This linear ratchet plate 30 as shown in FIGS. 4-8 and 10 includes a plurality of vertically spaced teeth 32 and also has a connection 34 to the armrest as is hereinafter more fully described to support the armrest for its vertical movement and for pivotal positioning. The linear ratchet plate 30 has a plurality of vertically spaced teeth and also has its connection 34 embodied by a pivotal connection member 36 for supporting the armrest on the linear ratchet plate as is hereinafter more fully described.

Figure 6:
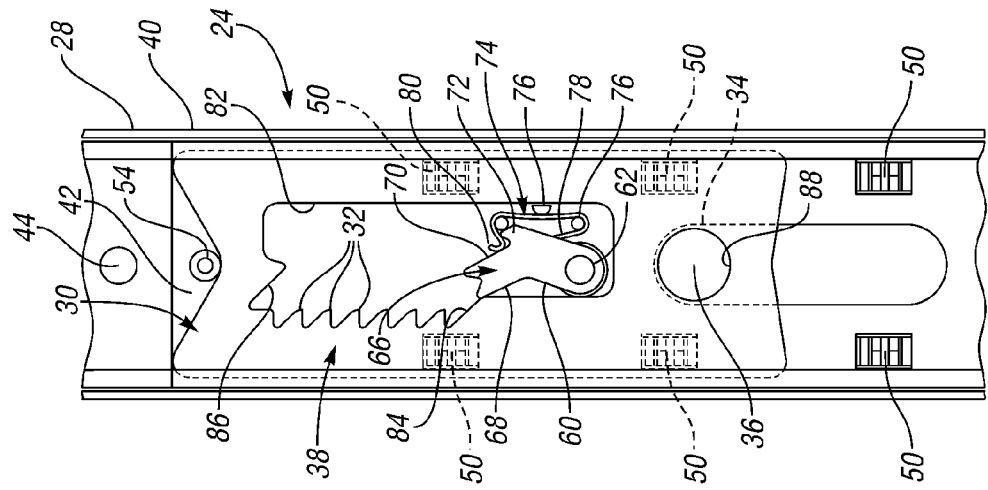
FIG. 6 is a view similar to FIG. 5 but showing the ratchet mechanism as the pawl locking assembly is released to permit downward movement of the armrest to its lowermost position of FIG. 6 where the pawl locking assembly is then moved to its locking condition.
Figure 5:
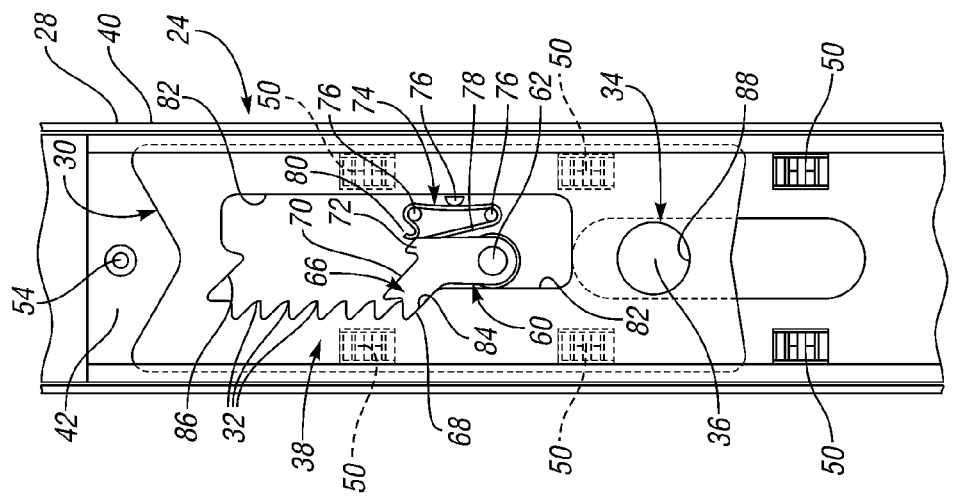
FIG. 5 is a view similar to FIG. 4 but shown with the armrest in its uppermost adjusted position.
Figure 4:
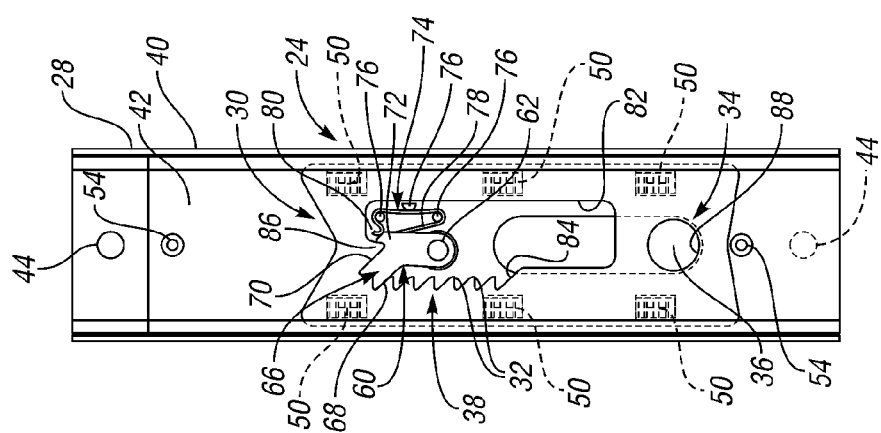
FIG. 4 is a view illustrating a ratchet mechanism of the armrest assembly and shown when the armrest is moved to a lowermost position where a pawl locking assembly is moved from a released condition to a locking condition to permit upward adjusting movement of the armrest to successively higher positions.
Figure 7:
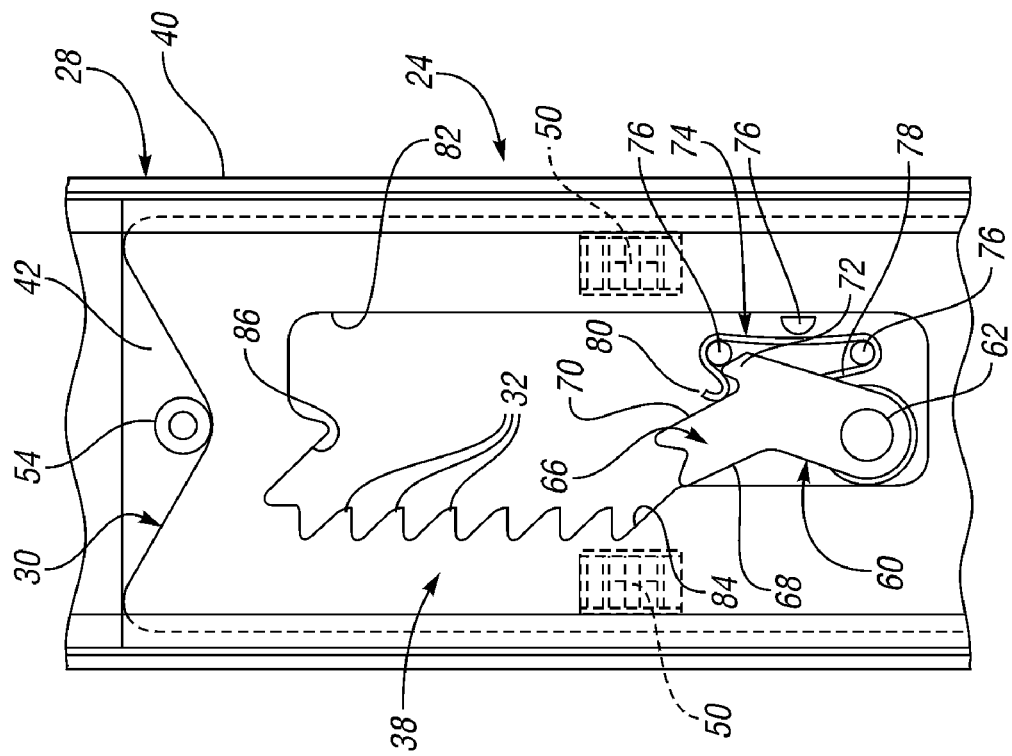
FIG. 7 is an enlarged view of a portion of FIG. 4 showing the pawl locking assembly after its pawl has been cammed from a released position to a locking position.
Figure 8:
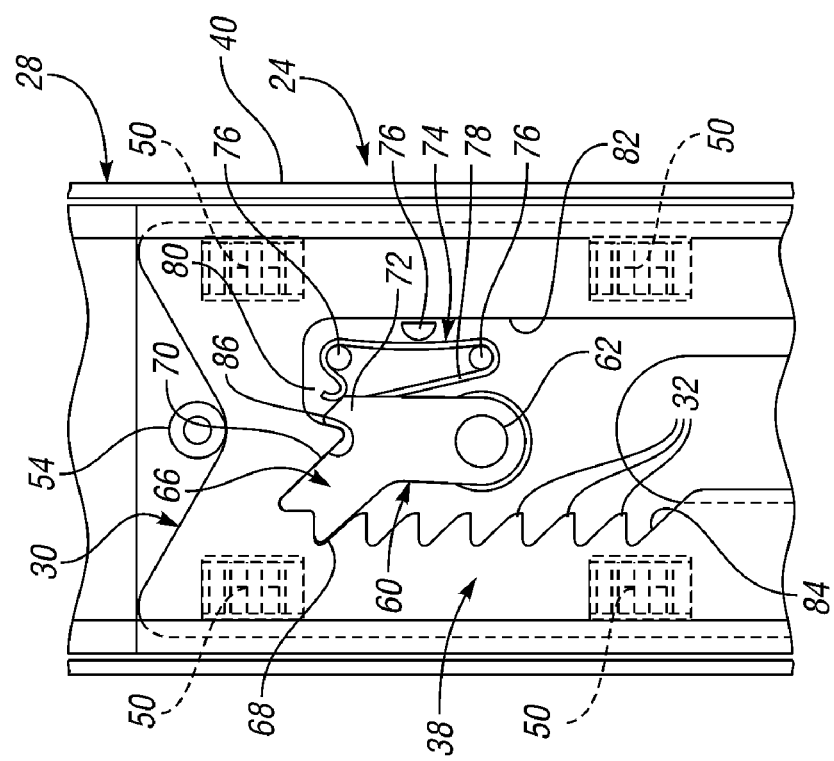
FIG. 8 is an enlarged view of a portion of FIG. 6 showing the pawl locking assembly after it has been cammed from the locking position to the released position.

With further reference to FIGS. 4-8 and 10, a pawl locking assembly 38 is mounted on the vertical track 28 and has a locking condition shown in FIGS. 4, 5 and 7 for cooperating with the teeth 32 of the linear ratchet plate 30 to permit vertical adjustment of the armrest from the lowermost position shown in FIGS. 4 and 7 to successively higher positions until reaching the uppermost position as illustrated in FIG. 5 whereupon the pawl locking mechanism is moved to a released condition as shown in FIGS. 6 and 8 to permit downward movement of the armrest back to its lowermost position.

The pawl locking assembly 38 upon movement of the armrest to its lowermost position is moved from its released condition shown in FIGS. 6 and 8 to its locking condition shown in FIGS. 4, 5 and 7 to again permit the upward armrest adjustment.

Figure 9:
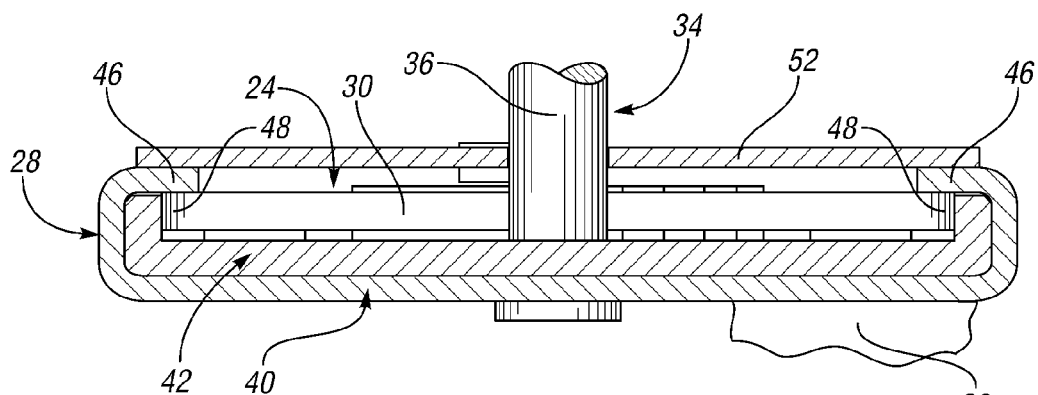
FIG. 9 is a sectional view taken through the vertical track of the armrest assembly along the direction of line 9-9 in FIG. 1 and shows a vertical track member, a pressure plate, a linear ratchet plate, a cover and a connection embodied by a pivotal connection member that mounts the armrest on the vertical track for its vertical adjusting movement.

As best shown in FIGS. 9 and 10, the vertical track 28 includes a vertical track member 40 and a pressure plate 42 mounted by the vertical track member and cooperating therewith to mount the linear ratchet plate 30 for vertical movement that through the connection 34 moves the armrest vertically. The vertical track member 40 has attachment openings 44 through which unshown fasteners can be inserted to mount the track assembly on the associated vehicle seat frame. The vertical track member 40 as shown in FIG. 9 has a generally flattened U shaped configuration and includes spaced flanges 46 that extend toward each other and slidably contact one side of the linear ratchet plate 24 at its opposite edges 48. Furthermore, the pressure plate 42 has spaced slide portions 50 that slidably contact the other side of the linear ratchet plate to provide a rattle free mounting for the vertical movement as previously described. In addition, a cover 52 is mounted on the flanges 46 of the vertical track member 40. Lower and upper rivets 54 shown in FIG. 10 are received within openings 56 in the pressure plate 42 and openings 58 in the cover 52 and function to limit vertical movement of the linear ratchet plate 30 without overloading the pawl locking assembly 38.

As shown in FIGS. 4-8 and 10, the pawl locking assembly 38 includes a pawl 60 pivotally mounted by a headed pin 62 that is received in an opening 64 in the pressure plate 42 (FIG. 10). Pawl 62 as shown in FIGS. 4-8 has a locking portion 66 and is pivotally moved between the locking position of FIGS. 4, 5 and 7 and the released position of FIGS. 6 and 8 for controlling the armrest vertical movement. This locking portion 66 has release and locking surfaces 68 and 70 for controlling the locking or released positioning of the pawl 60. In addition, the pawl 60 has a catch portion 72 utilized to hold the pawl in the released position of FIG. 8 as described below.

A formed leaf spring 74 best shown in FIGS. 7 and 8 is supported as illustrated by mounting projection 76 on the pressure plate 42 and has one leg that provides a spring bias 78 for biasing the pawl 60 toward its locking position shown in FIGS. 4, 5 and 7. Spring 74 has another leg forming a curved catch 80 that engages the pawl catch portion 72 to hold the pawl 60 in the release position shown in FIGS. 6 and 8.

The linear ratchet plate 30 shown in FIGS. 4-8 and 10 includes an opening 82 that received the pawl locking assembly 38 and defines the vertically spaced teeth 32 utilized in the armrest positioning. The linear ratchet plate opening 82 also includes lower and upper camming surfaces 84 and 86. When the armrest is moved to its uppermost position as shown in FIG. 5, the lower camming surface 84 contacts the release surface 68 of the pawl locking portion 66 and pivots the pawl from its locking position to its released position shown in FIGS. 6 and 8 where the catch 80 engages the catch portion 72 of the pawl and holds the pawl in this released position so that the pawl locking assembly is in its released condition. The armrest can then be moved downwardly from the uppermost position shown in FIGS. 6 and 8 to the lowermost position shown in FIGS. 4 and 7 where the upper camming surface 86 of the linear ratchet plate contacts the release surface 70 of the pawl locking portion 66 to pivot the pawl to its locking position out of engagement with the spring catch 80 and the spring bias 78 then biases the pawl for its ratcheting movement with the vertically spaced teeth 32 to permit upward adjustment of the armrest to successively higher positions until again reaching its uppermost position.

As shown in FIG. 10, the linear ratchet plate 30 also has a lower opening 88 that receives the pivotal pin 36 of connection 34 for the vertical movement of the armrest with the linear ratchet plate. This pivotal connection member 36 also extends through vertical openings 90, 92 and 94 in the vertical track member 40, pressure plate 42 and cover 52, respectively, so as to permit the vertical armrest adjustment. In addition, the pivotal connection member 36 of connection 34 is restrained from pivoting in any suitable manner such as by welding to the linear ratchet plate 30 or by suitable formations in any of the openings and flats on the connection member to prevent its rotation with respect to the ratchet mechanism while permitting the vertical movement.

Figure 11:
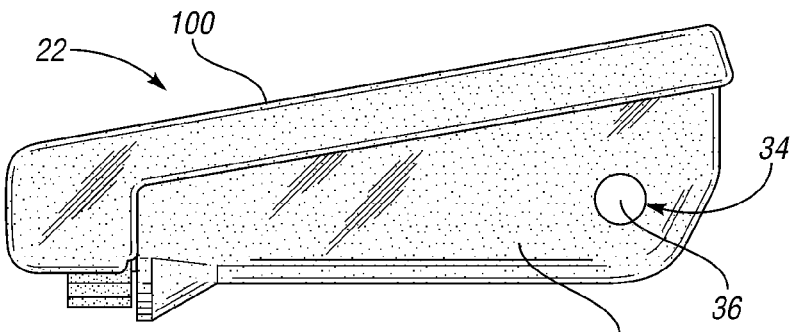
FIGS. 11 and 12 are side views of the armrest of the assembly and show the manner in which a lower housing mounts an upper armrest portion for adjustable movement.
Figure 12:
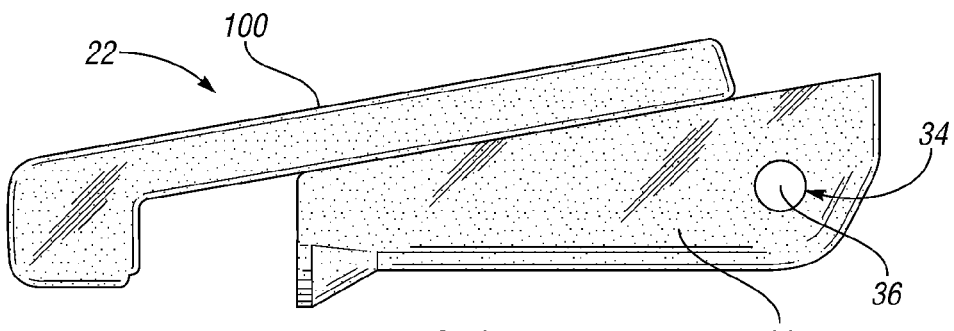
Figure 13:
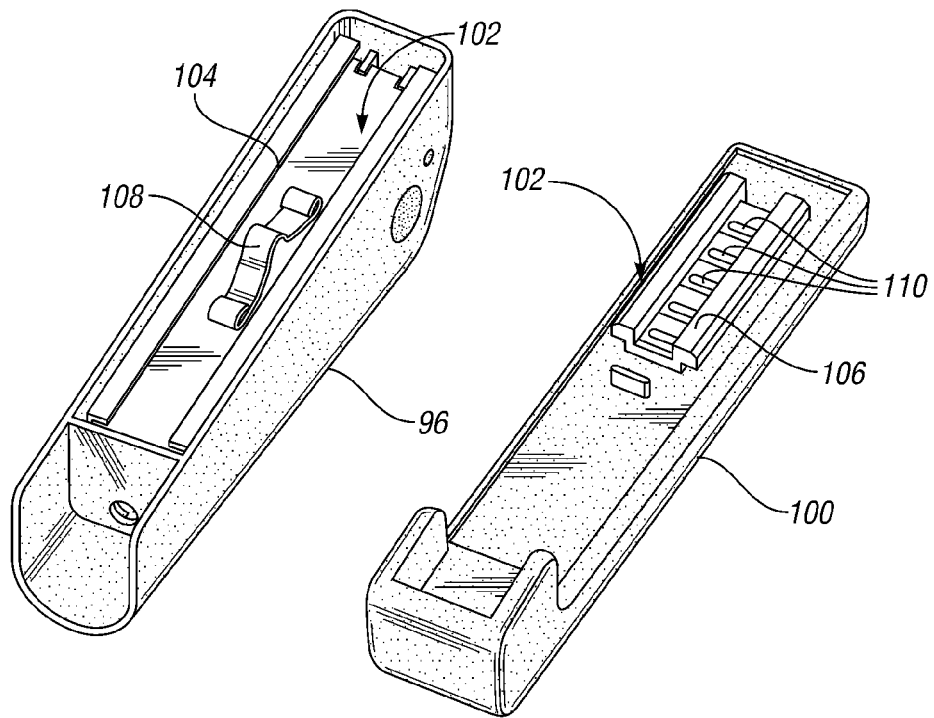
FIG. 13 is a perspective view that illustrates the upper armrest portion removed from the lower armrest housing to show a track assembly that mounts the upper armrest portion for its adjustable movement.

With reference to FIGS. 11-13, the armrest 22 includes a housing 96 that is mounted by the pivotal connection member 36 of connection 34 for the vertical adjusting movement as previously described. An upper armrest portion 100 of armrest 22 is supported by a track assembly collectively indicated by 102 in FIG. 13 for adjustable movement along the armrest housing. More specifically, the track assembly 102 includes a housing track member 104 and an upper armrest portion track member 106 that provide the support for adjustable movement. A detent spring 108 mounted by the track member 104 is received within detent openings 110 of the track member 106 to provide positioning at a plurality of locations.

With reference to FIGS. 14-16, the armrest housing 96 has spaced support portions that receive the pivotal connection member 36 of connection 34 and mounts the armrest for pivotal movement. An adjuster generally indicated by 114 adjusts the pivotal position of the armrest on the ratchet mechanism that controls the vertical positioning as previously described. As illustrated in FIG. 15, this adjustment from a horizontal reference line 116 is downward about 25° to a reference line 118 or upward about 40° to a reference line 120. Of course, different adjustment can also be utilized as appropriate for the particular armrest and its usage. In addition, the armrest can also be pivoted to a nonuse or storage position that is generally vertical but slightly rearwardly inclined as shown by reference line 122.

As previously mentioned, the pivotal connection member 36 of connection 34 is restrained against rotational movement by the ratchet mechanism while supporting the armrest for the pivotal movement described above. A vertical pin 124 extends through the pivotal connection member 36 and cooperates with the adjuster 114 to control the armrest pivoting.

Adjuster 114 includes a threaded adjusting member 126 and is rotatably supported along the elongated direction of the armrest by a support web 128 and a nut 130 fixed in a suitable manner on the armrest housing. A knob 132 at the opposite end of the armrest housing from the pivotal connection member 36 permits manual rotation of the threaded adjustment member 126 whose end 134 contacts the vertical pin 124. As such, rotation of the knob 132 in one direction or the other pivots the armrest upwardly or downwardly between the positions of reference lines 118 and 120 shown in FIG. 15. Also, a leaf spring 136 mounted on the armrest is biased against the threaded adjustment member 126 against movement after adjustment. Furthermore, a stop pin 138 contacts the vertical pin 124 when the armrest is pivoted to the nonuse position to limit the rearwardly inclined movement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat armrest assembly comprising:

an armrest;

a ratchet mechanism for mounting the armrest on a vehicle seat frame, the ratchet mechanism including a vertical track for mounting on the seat frame and a linear ratchet plate mounted for vertical movement on the vertical track, the linear ratchet plate having vertically spaced teeth and a connection to the armrest to support the armrest;

a pawl locking assembly mounted by the vertical track and having a locking condition for cooperating with the teeth of the linear ratchet plate to permit vertical adjustment of the armrest from a lowermost position upwardly to successively higher positions until reaching an uppermost position whereupon the pawl locking assembly is moved to a released condition to permit downward movement of the armrest to its lowermost position, and the pawl locking assembly upon movement of the armrest to its lowermost position being moved from its released condition to its locking condition to again permit the upward armrest adjustment; and the pawl locking assembly including a pawl pivotally mounted on the track for movement between locking and released positions with respect to the linear ratchet plate teeth, a spring bias that biases the pawl toward a locking position for contacting the teeth of the linear ratchet plate to support the armrest at a selected vertical location against downward movement while allowing upward movement to a higher location, a catch, a lower camming surface on the linear ratchet plate for camming the pawl against the spring bias from its locking position to a released position out of contact with the linear ratchet plate teeth where the pawl is held by the catch when the armrest is moved to the uppermost position such that the armrest can then be moved to the lowermost position, an upper camming surface on the linear ratchet plate for camming the pawl for release from the catch and movement to its locking position when the armrest is moved to its lowermost position in order to again permit upward adjusting movement of the armrest, and a spring having one leg that embodies the spring bias and another leg that embodies the catch.

2. A vehicle seat armrest assembly as in claim 1 wherein the vertical track includes a vertical track member and a pressure plate that is mounted by the vertical track member and cooperates therewith to mount the linear ratchet plate for vertical movement.

3. A vehicle seat armrest assembly as in claim 2 wherein the vertical track member includes spaced flanges that slidably contact one side of the linear ratchet plate, and the pressure plate including spaced slide portions that slidably contact the other side of the linear ratchet plate.

4. A vehicle seat armrest assembly as in claim 3 further including a cover mounted on and extending between the spaced flanges of the vertical track member.

5. A vehicle seat armrest assembly as in claim 1 wherein the linear ratchet plate includes an upper opening within which its vertically spaced teeth are mounted, and a lower opening that receives a connecting member of the armrest connection.

6. A vehicle seat armrest assembly as in claim 5 wherein a vertical track member, a pressure plate and a cover of the vertical track include vertically openings that receive the connection member of the armrest connection while permitting vertical movement thereof as the armrest is moved vertically.

7. A vehicle seat armrest assembly comprising:

an armrest;

a ratchet mechanism for mounting the armrest on a vehicle seat frame, the ratchet mechanism including a vertical track for mounting on the seat frame and a linear ratchet plate mounted for vertical movement on the vertical track, the linear ratchet plate having vertically spaced teeth and a connection to the armrest to support the armrest;

a pawl locking assembly mounted by the vertical track and having a locking condition for cooperating with the teeth of the linear ratchet plate to permit vertical adjustment of the armrest from a lowermost position upwardly to successively higher positions until reaching an uppermost position whereupon the pawl locking assembly is moved to a released condition to permit downward movement of the armrest to its lowermost position, and the pawl locking assembly upon movement of the armrest to its lowermost position being moved from its released condition to its locking condition to again permit the upward armrest adjustment;

the pawl locking assembly including a pawl pivotally mounted on the track for movement between locking and released positions with respect to the linear ratchet plate teeth, a spring bias that biases the pawl toward a locking position for contacting the teeth of the linear ratchet plate to support the armrest at a selected vertical location against downward movement while allowing upward movement to a higher location, a catch, a lower camming surface on the linear ratchet plate for camming the pawl against the spring bias from its locking position to a released position out of contact with the linear ratchet plate teeth where the pawl is held by the catch when the armrest is moved to an uppermost position such that the armrest can then be moved to the lowermost position, and an upper camming surface on the linear ratchet plate for camming the pawl for release from the catch and movement to its locking position when the armrest is moved to its lowermost position in order to again permit upward adjusting movement of the armrest;

the armrest including a housing mounted by the connection to the ratchet mechanism, a track assembly mounted by the housing, and an upper armrest portion mounted on the housing by the track assembly for adjustable movement along the armrest housing; and the connection of the ratchet mechanism to the armrest including a pivotal connection member that pivotally mounts the armrest housing, and an adjuster for adjusting the pivotal position of the armrest on the ratchet mechanism.

8. A vehicle seat armrest assembly comprising:

an armrest;

a ratchet mechanism for mounting the armrest on a vehicle seat frame, the ratchet mechanism including a vertical track for mounting on the seat frame and a linear ratchet plate mounted for vertical movement on the vertical track, the linear ratchet plate having vertically spaced teeth and a connection to the armrest to support the armrest;

a pawl locking assembly mounted by the vertical track and having a locking condition for cooperating with the teeth of the linear ratchet plate to permit vertical adjustment of the armrest from a lowermost position upwardly to successively higher positions until reaching an uppermost position whereupon the pawl locking assembly is moved to a released condition to permit downward movement of the armrest to its lowermost position, and the pawl locking assembly upon movement of the armrest to its lowermost position being moved from its released condition to its locking condition to again permit the upward armrest adjustment;

the pawl locking assembly includes a pawl pivotally mounted on the track for movement between locking and released positions with respect to the linear ratchet plate teeth, a spring bias that biases the pawl toward a locking position for contacting the teeth of the linear ratchet plate to support the armrest at a selected vertical location against downward movement while allowing upward movement to a higher location, a catch, a lower camming surface on the linear ratchet plate for camming the pawl against the spring bias from its locking position to a released position out of contact with the linear ratchet plate teeth where the pawl is held by the catch when the armrest is moved to the uppermost position such that the armrest can then be moved to the lowermost position, and an upper camming surface on the linear ratchet plate for camming the pawl for release from the catch and movement to its locking position when the armrest is moved to its lowermost position in order to again permit upward adjusting movement of the armrest;

the armrest including a housing mounted by the connection to the ratchet mechanism, a track assembly mounted by the housing, an upper armrest portion mounted on the housing by the track assembly for adjustable movement along the armrest housing, and the track assembly including a detent spring for adjustably positioning the upper armrest portion in a selected position on the housing; and the connection of the ratchet mechanism to the armrest including a pivotal connection member that pivotally mounts the armrest housing, an adjuster for adjusting the pivotal position of the armrest on the ratchet mechanism, and the adjuster including a threaded adjusting member have an knob that is rotated to adjust the pivotal position of the armrest on the ratchet mechanism.

9. A vehicle seat armrest assembly comprising:

an armrest;

a ratchet mechanism for mounting the armrest on a vehicle seat frame, the ratchet mechanism including a vertical track for mounting on the seat frame and a linear ratchet plate mounted for vertical movement on the vertical track, the linear ratchet plate having vertically spaced teeth and a connection to the armrest to support the armrest;

a pawl locking assembly mounted by the vertical track and having a locking condition for cooperating with the teeth of the linear ratchet plate to permit vertical adjustment of the armrest from a lowermost position upwardly to successively higher positions until reaching an uppermost position whereupon the pawl locking assembly is moved to a released condition to permit downward movement of the armrest to its lowermost position, and the pawl locking assembly upon movement of the armrest to its lowermost position being moved from its released condition to its locking condition to again permit the upward armrest adjustment; and the armrest including a housing mounted by the connection to the ratchet mechanism, a track assembly mounted by the housing, and an upper armrest portion mounted on the housing by the track assembly for adjustable movement along the armrest housing.

10. A vehicle seat armrest assembly as in claim 9 wherein the track assembly includes a detent spring for adjustably positioning the upper armrest portion in a selected position on the housing.

11. A vehicle seat armrest assembly comprising:

an armrest;

a ratchet mechanism for mounting the armrest on a vehicle seat frame, the ratchet mechanism including a vertical track for mounting on the seat frame and a linear ratchet plate mounted for vertical movement on the vertical track, the linear ratchet plate having vertically spaced teeth and a connection to the armrest to support the armrest;

a pawl locking assembly mounted by the vertical track and having a locking condition for cooperating with the teeth of the linear ratchet plate to permit vertical adjustment of the armrest from a lowermost position upwardly to successively higher positions until reaching an uppermost position whereupon the pawl locking assembly is moved to a released condition to permit downward movement of the armrest to its lowermost position, and the pawl locking assembly upon movement of the armrest to its lowermost position being moved from its released condition to its locking condition to again permit the upward armrest adjustment; and the armrest including a housing, the connection of the ratchet mechanism to the armrest including a pivotal connection member that pivotally mounts the armrest housing, and an adjuster for adjusting the pivotal position of the armrest on the ratchet mechanism.

12. A vehicle seat armrest assembly as in claim 11 wherein the adjuster includes a threaded adjusting member have an knob that is rotated to adjust the pivotal position of the armrest on the ratchet mechanism.

13. A vehicle seat armrest assembly as in claim 12 further including a spring mounted on the housing to hold the threaded adjusting member against movement after adjustment.

* * * * *

UNITED STATES PATENT AND TRADEMARK OFFICE
CERTIFICATE OF CORRECTION

| | | |
|---|---|---|
| PATENT NO. | : 7,828,390 B2 | Page 1 of 1 |
| APPLICATION NO. | : 12/112243 | |
| DATED | : November 9, 2010 | |
| INVENTOR(S) | : Liu et al. | |

It is certified that error appears in the above-identified patent and that said Letters Patent is hereby corrected as shown below:

Column 6, Line 64, Claim 6:

Delete "vertically openings" and
Insert -- vertical openings --.

Column 8, Line 39, Claim 8:

Delete "vertically openings" and
Insert -- vertical openings --.

Signed and Sealed this
Twenty-sixth Day of April, 2011

David J. Kappos
*Director of the United States Patent and Trademark Office*